Sept. 9, 1958 C. T. ASBURY 2,851,028
LOOP TENSION CUTTER
Filed Oct. 3, 1955
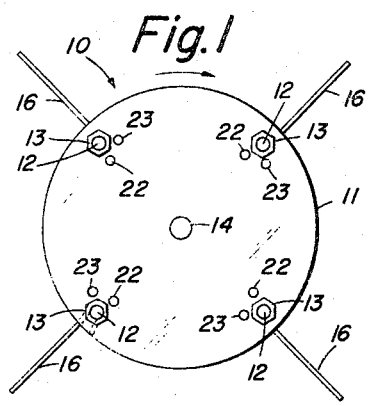
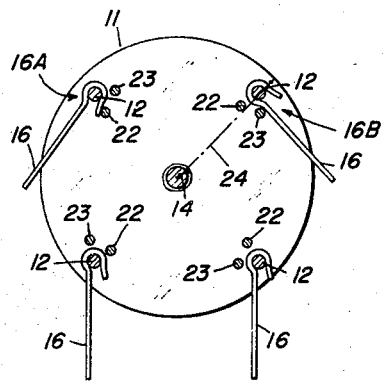
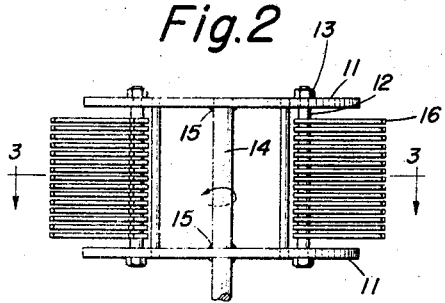
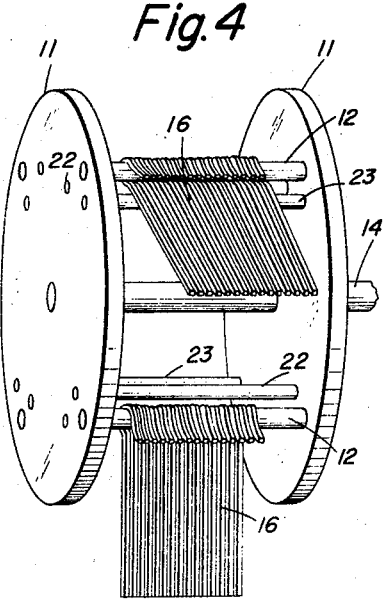
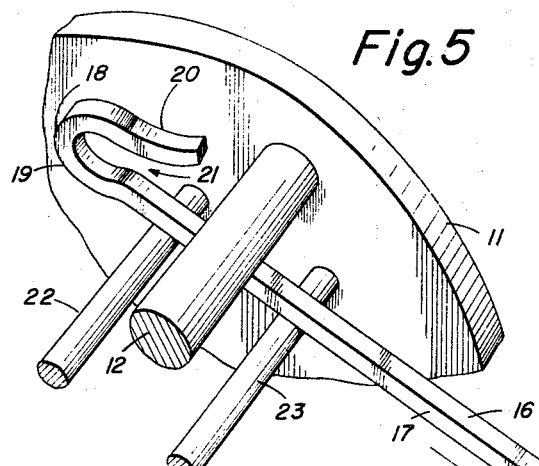
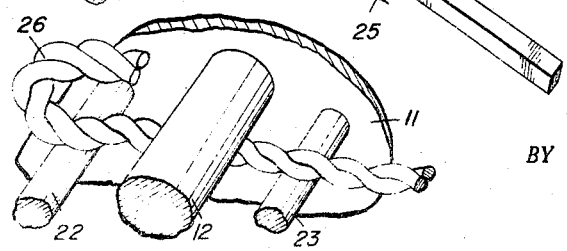
INVENTOR.
CHARLES T. ASBURY
BY Toulmin & Toulmin
ATTORNEYS

United States Patent Office 2,851,028
Patented Sept. 9, 1958

2,851,028

LOOP TENSION CUTTER

Charles T. Asbury, Fort Lauderdale, Fla.

Application October 3, 1955, Serial No. 537,922

4 Claims. (Cl. 125—5)

The present invention relates to a cutting and abrading tool, more particularly, to a rotary cutting tool having a plurality of detachable pivotally mounted cutting elements around the periphery thereof.

In many operations requiring the treatment of a surface, a special type of flail-like rotary tool may be beneficially employed. This tool, which is referred to as a rotary cutting tool since its action is cutting or abrading, essentially comprises a plurality of loosely or pivotally mounted cutting elements about the periphery thereof. Rotation of the tool results in centrifugal force extending the cutting elements beyond the peripheral edges of the tool. When the cutting elements engage a surface, an impact and scraping force is inflicted against the surface.

Tools of this type have found the greatest use in cleaning surfaces of paint or the like, in working stone and other similar operations where a steady, continuous force is desired.

The cutting tools conventionally employed comprise a pair of spaced plates having a number of rods or retaining bolts interconnecting the plates at points adjacent the peripheries thereof. The cutting members are pivotally mounted on these rods. The cutting members are made of varying shapes depending upon the specific application to which the tool is employed.

The conventional cutting element comprises an aperture at one end through which the retaining bolt is passed. When it is desired to replace the cutting elements it is necessary to dismantle the cutting tool, or at least to remove the bolts, which hold the cutting elements in position. Consequently, it is necessary that the bolts be removably positioned within the spaced plates. Therefore, the bolts add very little to the structural strength of the cutting tool since they are not employed to connect the plates together but to retain the cutting elements in position.

In addition, in order to assemble or remove the cutting elements upon the cutting tool it is necessary to dismantle the cutting tool.

To overcome these disadvantages it has been deemed desirable to devise a rotary cutting tool wherein the cutting elements may be assembled or removed therefrom without dismantling the cutting tool. The present invention is directed towards achieving this objective.

The present invention essentially comprises a rotary cutting tool which consists of the conventional spaced circular plates. These plates are interconnected by a plurality of rods which are positioned inwardly of the peripheries of the plates. A plurality of cutting elements are then pivotally mounted upon each of the interconnecting rods.

The cutting elements are made of resilient material and comprise elongated members each of which has a hooked portion at one end thereof. This hooked portion is positioned about the rod. The opening of the hooked portion is made smaller than the looped portion in order to permit the hook portion to snap on the rods. This structure will assist in retaining the cutting elements in position upon the rods.

Additional safety features are provided in the cutting tool of this invention in order to limit the movement of the hooked portion about the rods. These safety features comprise a pair of pins positioned inwardly of each of the rods. One pin functions to engage the open end of the hooked portion to prevent the cutting element from being displaced from the rod upon excessive rotation of the cutting element. The two pins together are so positioned that the cutting elements may be removed from the rods only when the rods are placed in a certain position. This serves as an additional safety feature for retaining the cutting elements upon the rods.

It is, therefore, the principal object of this invention to provide an improvement in cutting and abrading tools.

It is an additional object of this invention to provide a loop tension cutting tool.

It is another object of this invention to provide an improvement in assembling flail-like cutting elements in a rotary cutting tool.

It is a further object of this invention to provide a rotary cutting tool having flail-like cutting elements which may be readily assembled or removed.

It is still an additional object of this invention to provide an improvement in cutting elements for a rotary cutting tool.

It is still another object of this invention to provide a rotary cutting tool having securely mounted flail-like pivotable cutting elements thereon but which may be readily removed or assembled without dismantling the cutting tool.

It is still a further object of this invention to provide a rotary cutting tool with flail-like cutting elements employing novel safety features to insure the continuous operativeness of the cutting elements.

Other objects and advantages of this invention will become apparent upon reference to the accompanying description when taken in conjunction with the following drawings wherein:

Figure 1 is a plan view of the rotary cutting tool of this invention;

Figure 2 is an elevational view of the cutting tool illustrated in Figure 1;

Figure 3 is a sectional view taken along the lines 3—3 of Figure 1;

Figure 4 is a three-quarter elevational view illustrating the position of the cutting elements upon the rods;

Figure 5 is a perspective view in enlarged detail of the rod and pin structure particularly illustrating the single position into which the cutting element must be placed for assembly or removal; and Figure 6 is a perspective view of a modification of the cutting element.

Returning now to the drawings, more particularly to Figure 1, wherein like reference symbols indicate the same parts throughout the various views, 10 indicates generally the cutting tool disclosed in this invention. The cutting tool comprises a pair of spaced circular plates 11 as shown in Figure 2, which are interconnected by a number of rods 12 positioned inwardly of the peripheries of the circular plates.

The rods 12 may be threaded at each end secured in place by the nuts 13, as illustrated in Figure 2, or may be secured permanently in position as illustrated in Figure 4.

A spindle 14 is centrally mounted with respect to the circular plates 11 in order to form an axis of rotation for the cutting tool. The spindle 14 is welded in the circular plates 11, as indicated at 15. However, other means known to those in the art may be readily employed for attaching the cutting tool to a spindle or shaft.

Positioned upon each one of the rods 11 is a plurality of cutting elements 16. The cutting element 16 is illustrated in greater detail in Figure 5 and is formed from a flat piece of wire square in cross-section. The cutting element has an elongated portion 17 at the end of which is a hooked portion 18 which comprises a reverse bend. The hooked portion 18 comprises a loop 19, which has an inner diameter sufficient to accommodate the rod, and a free end 20 which projects beyond the looped portion 19 to form an opening, indicated at 21, which is less than the inner diameter of the loop 19. Since the cutting element is formed from a wire or a resilient element member, this hooked portion structure enables the cutting elements to be snapped over the rod 12.

The diameter of the rod 12 may be made smaller than the inner diameter of the loop 19 to result in the cutting elements fitting loosely upon the rods. This relationship would enable individual cutting elements on the same rod to compensate for any irregularities in the surface being worked.

In Figure 6 there is illustrated a modified cutting element 26 which is formed from a pair of twisted wires. However, any number of wires may be twisted together to comprise the cutting element. The resulting cutting element is semi-rigid but has a sufficient degree of resiliency therein that it wears longer. Furthermore, the ends of the wires will be worn to form points. Thus the cutting element will be self-sharpening.

Interconnecting the circular plates 11 and positioned inwardly of the rods 12 is an auxiliary retaining pin 22 and a positioning pin 23. A pair of these pins is similarly positioned with respect of each of the rods 12. Referring to Figure 3, it may be seen that the retaining pin 22 is positioned to one side of and tangential to a radius 24 of the circular plate 11 upon which the rod 12 is located. The distance between the pin 22 and the rod 12 is sufficient to permit the outer edge of the free end 20 to engage the pin 22 when the pin rotates to the position illustrated by the cutting element 16A in Figure 3.

The retaining pin 22 has a dual purpose. Its first purpose is to limit the depth to which the hooked portion of the cutting element may extend inwardly of the rotary cutting tool. This position of the pin will prevent the cutting elements from becoming unhooked upon impact with the surface which is being treated.

The second purpose of the pin 22 is also a safety feature and is illustrated at 16A of Figure 3.

When the cutting element 16 rotates into the position illustrated at 16A of Figure 3, the pin 22 will function to urge the hooked portion to the closed position. This closing action of the hooked portion will constitute an additional safety feature in retaining the cutting elements upon the rods. The hooked portion will not remain closed because of the resiliency of the cutting element.

The positioning pin 23 is situated on the other side of the plate radius 24 and also inwardly of its respective rod 12. The pin 23 is spaced substantially one-half the diameter of the rod 12 from the radius line 24 so that it will engage the cutting element 16 at the junction of the core portion 18 and elongated member 17, as illustrated in position 16B of Figure 3.

The space between the pins 22 and 23 and the respective rod 12 is slightly greater than the width of the cutting element 16. This will permit the passage of the cutting elements between the pins and the rods in the manner illustrated in Figure 5. Consequently, the location of the pins 22 and 23 results in only one position from which the cutting element must be assembled or removed from the rod.

As shown in Figure 5, the elongated end of the cutting element is inserted between the pins and the rod 12 in the direction indicated by the arrow 25, until the hooked portion reaches the rod. Additional movement of the cutting element in the direction of the arrow will result in the hooked portion being snapped over the rod.

The removal of the cutting element from the rod is the reverse of the assembly. The hooked portion is unsnapped from the rod after the cutting element has been pivoted to the position as illustrated in Figure 5 and then moved in the opposite direction of the arrow 25.

Although the rotary cutting tool illustrated as the embodiment of this invention comprises a plurality of cutting elements positioned upon the rods, it should be borne in mind that for special uses it may be desired to position the circular plates closer together so that only a single cutting element may be accommodated upon each of the interconnecting rods. This structure will be desirable when it is intended to use the cutting tool to clean expansion joints between concrete sections of roads, expansion joints for runways for airports, and the like.

In operation, the cutting tool of this invention functions similarly to the conventional cutting tool having flail-like cutting elements. The cutting elements deliver a pounding and scraping to the surface which they contact. High rotary speeds are not required—a speed of the order of 500 R. P. M. is most effective.

The cutting tool of this invention readily lends itself to many varied uses. The successive impacts delivered by the flailing action of the cutting elements are particularly suitable for cleaning, such as removing or loosening paint, scale, rust and the like. Similarly, the cutting tool may be used for removing traffic paint from highways. By making the cutting tool of sufficient width, the tool may be readily used on a tractor for removing ice from sidewalks, airfields and the like. Other uses include cleaning concrete and cinder aggregations from forms and moulds and for removing form marks from poured concrete. Stone and concrete surfaces may be readily worked by the flailing cutting elements.

In general, it may be said that any operation which requires a steady power, impact and pounding may be carried out by the cutting tool of this invention. The pounding, plus the scraping action of the cutting elements may be readily adjusted by positioning the distance of the rotary cutting tool above the surface which is to be treated.

Thus it can be seen that the present invention discloses an improvement in rotary cutting tools employing flail-like cutting elements since the cutting elements disclosed may be readily attached and detached from the rotary cutting tool without dismantling of the tool. The hook-like cutting element which is disclosed herein is retained upon the rods during operation by safety devices comprising pins located inwardly of the rods.

The multitude of uses to which a cutting tool of this type may be applied plus the novel features disclosed herein result in a cutting or abrading tool which will be extremely useful in numerous industrial operations.

It will be understood that this invention is susceptible to modification in order to adapt it to different usages and conditions, and, accordingly, it is desired to comprehend such modifications within this invention as may fall within the scope of the appended claims.

What is claimed is:

1. In a rotary cutting tool, a pair of spaced circular plates, a plurality of rods interconnecting said plates inwardly from the peripheries thereof, and a plurality of resilient cutting elements having hooked portions pivotally mounted on said rods, said hooked portions comprising a reverse bend forming a loop having a diameter greater than that of said rods and a throat having a width smaller than the diameter of said rods with the entrance to said throat being enlarged so as to cam over said rod to open said throat when assembling said cutting elements on said rods.

2. In a rotary cutting tool as claimed in claim 1 with each of said cutting elements comprising a pair of twisted wires formed with a hooked portion at one end thereof.

3. In a rotary cutting tool, a pair of spaced circular plates, a plurality of rods interconnecting said plates inwardly from the peripheries thereof, and a plurality of resilient cutting elements having hooked portions pivotally mounted on said rods, said hooked portions comprising a reverse bend forming a loop having a diameter greater than that of said rods and a throat having a width smaller than the diameter of said rods with the entrance to said throat being enlarged so as to cam over said rod to open said throat when assembling said cutting elements on said rods, and a pin between said plates further inwardly of said periphery than said rod and laterally of a radius extending through said rod engageable with the enlarged entrance of a said cutting element throat at the extreme angular position of the pivotal movement of the cutting element on the rod.

4. In a rotary cutting tool, a pair of spaced circular plates, a plurality of rods interconnecting said plates inwardly from the peripheries thereof, and a plurality of resilient cutting elements having hooked portions pivotally mounted on said rods, said hooked portions comprising a reverse bend forming a loop having a diameter greater than that of said rods and a throat having a width smaller than the diameter of said rods with the entrance to said throat being enlarged so as to cam over said rod to open said throat when assembling said cutting elements on said rods, and a pair of stop pins parallel to each of said rods further inwardly of the periphery of said plate than said rods and spaced laterally of a radius extending through said rod.

References Cited in the file of this patent

UNITED STATES PATENTS

| | | |
|---|---|---|
| 1,394,789 | Prell | Oct. 25, 1921 |
| 1,692,028 | Elliott | Nov. 20, 1928 |
| 2,279,922 | Kraner | Apr. 14, 1942 |
| 2,505,576 | Reitan | Apr. 25, 1950 |
| 2,523,319 | Middlestadt | Sept. 26, 1950 |
| 2,663,137 | Asbury | Dec. 22, 1953 |
| 2,734,498 | Von Arx | Feb. 17, 1956 |
| 2,763,257 | Asbury | Sept. 18, 1956 |